(No Model.)  4 Sheets—Sheet 1.
A. F. RANDALL.
APPARATUS FOR MANUFACTURING GAS.
No. 317,953.  Patented May 12, 1885.
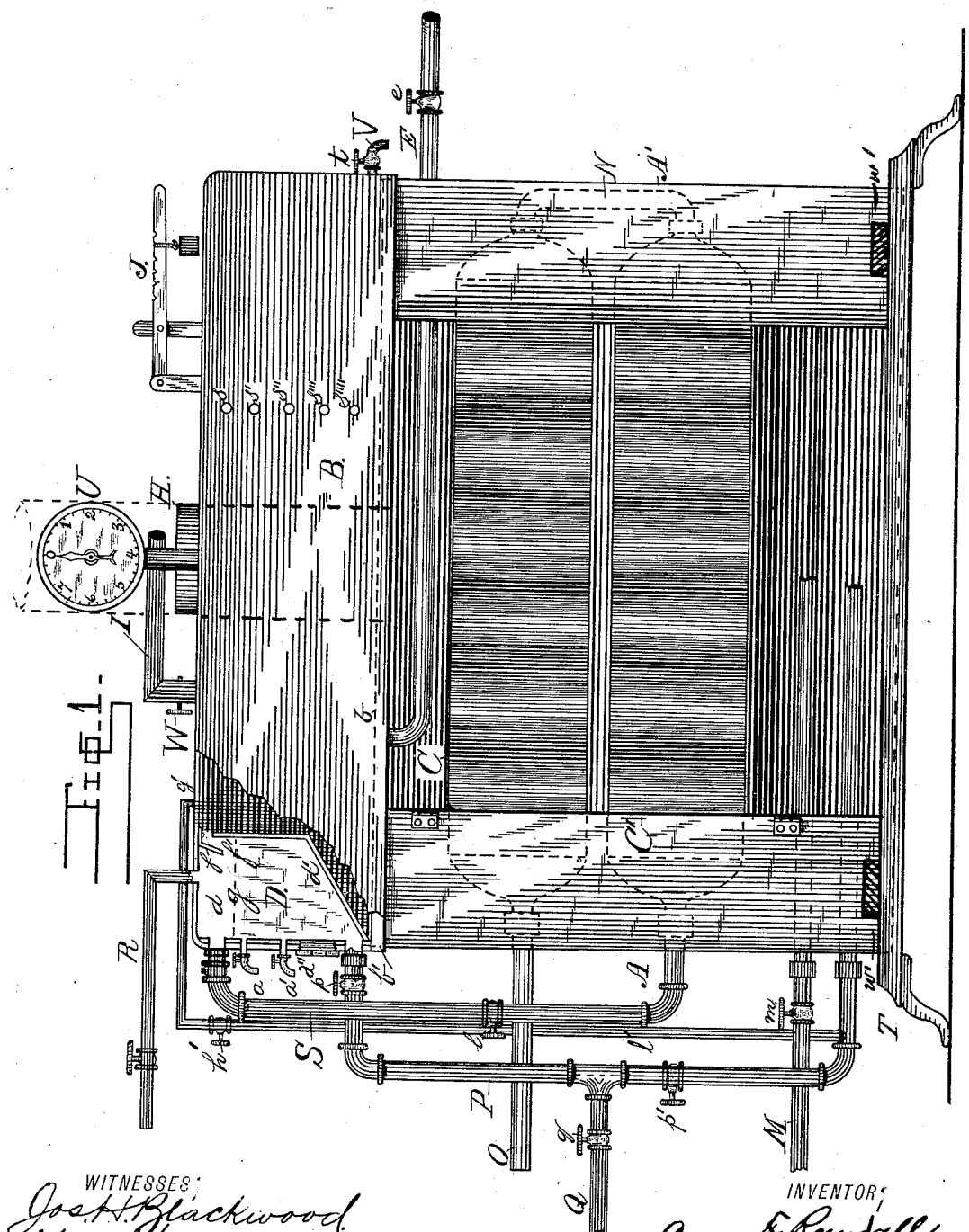
WITNESSES:
Jos. H. Blackwood
W. W. Jackson
INVENTOR:
Aaron F. Randall (No Model.)  4 Sheets—Sheet 2.
A. F. RANDALL.
APPARATUS FOR MANUFACTURING GAS.
No. 317,953. Patented May 12, 1885.
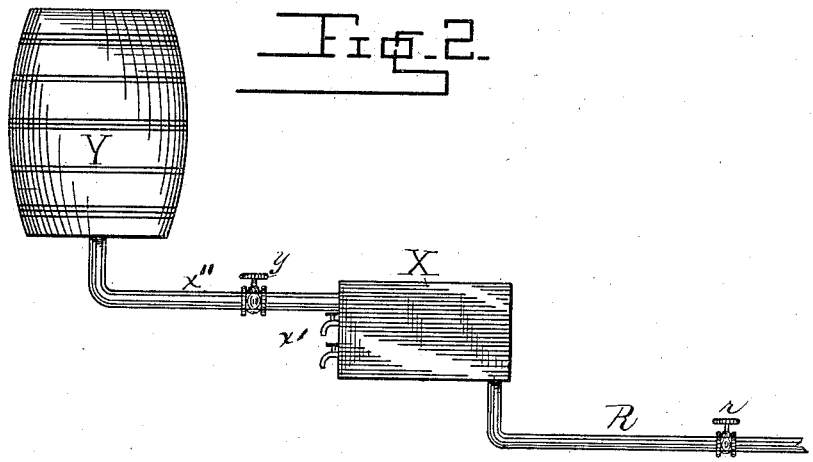
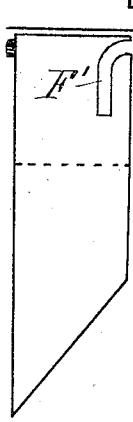
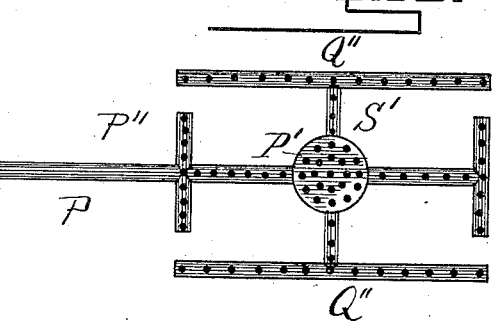
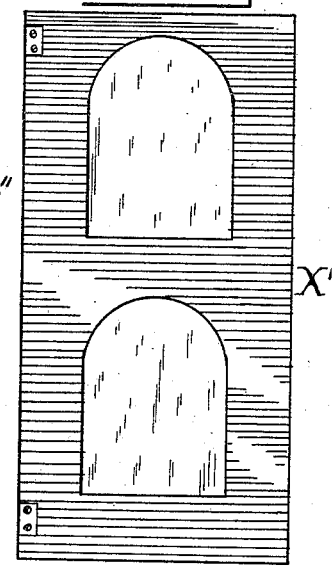
WITNESSES:
Jos. H. Blackwood
W. W. Jackson
INVENTOR:
Aaron F. Randall

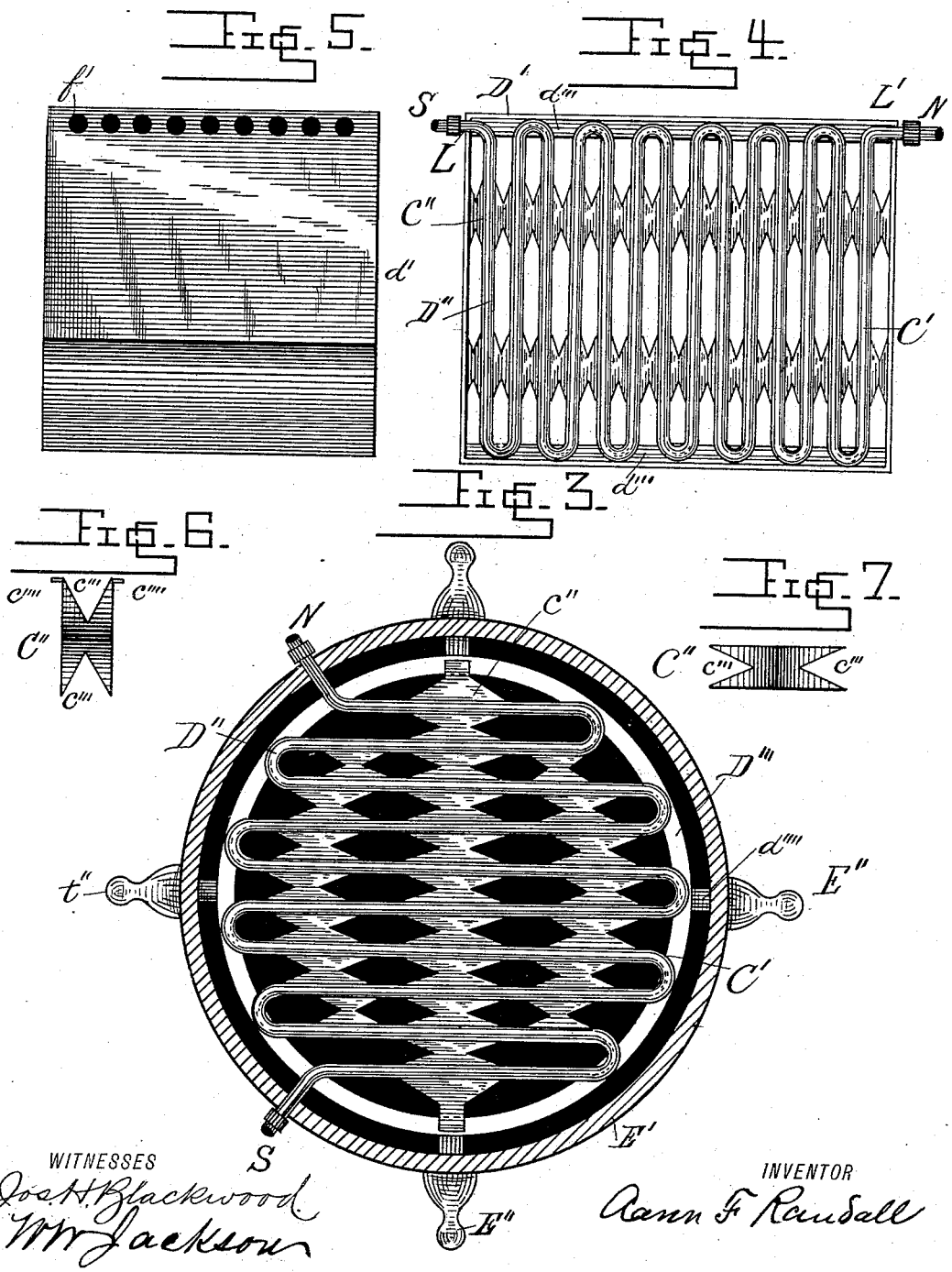

(No Model.)  4 Sheets—Sheet 4.
A. F. RANDALL.
APPARATUS FOR MANUFACTURING GAS.
No. 317,953.  Patented May 12, 1885.
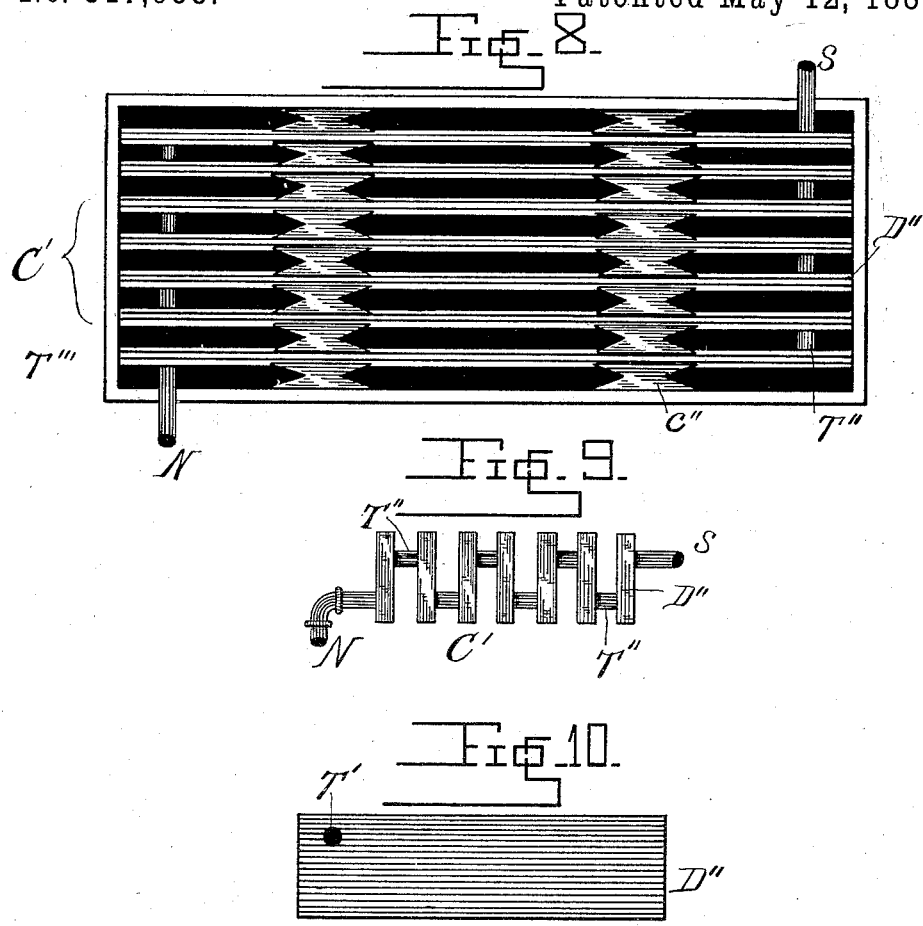

UNITED STATES PATENT OFFICE.

AARON F. RANDALL, OF WASHINGTON, DISTRICT OF COLUMBIA, ASSIGNOR OF ONE-EIGHTH TO CARLOS B. RANDALL, OF SAME PLACE.

APPARATUS FOR MANUFACTURING GAS.

SPECIFICATION forming part of Letters Patent No. 317,953, dated May 12, 1885.

Application filed March 13, 1885. (No model.)

*To all whom it may concern:*

Be it known that I, AARON F. RANDALL, a citizen of the United States, residing in the city of Washington, in the District of Columbia, have invented a new and useful Improvement in apparatus for manufacturing gas for heating and illuminating purposes from steam and the volatile portions of hydrocarbons; and I do declare that the following is a full, clear, and exact description of the invention, which will enable others skilled in the art to which it appertains to make and use the same.

The object of my invention is, first, to mix steam with the vapors of hydrocarbons at the earliest instant after the same are generated; second, to provide a retort constructed of pipes of such form that every particle of the combined steam and hydrocarbon vapors will come in contact with the heated surface of the pipes composing the retort in their passage through the same, which will dispense with the use of perforated diaphragms and other devices heretofore adopted and used to break up the volume of commingled steam and hydrocarbon vapors, and which will effect a thorough and perfect union of the particles of each with those of the other in order to produce a fixed gas for heating and illuminating purposes; and, lastly, to provide an apparatus simple and compact in its construction, easily to be understood as to its operations by persons of ordinary intelligence and mechanical skill, and which will at the same time be durable and safe in all of its parts. I effect these objects by the construction shown in the accompanying drawings, in which—

Figure 1 is a front view of the main portions of my machine, showing the burner and the doors of the furnace removed and part of the boiler broken away. Fig. 2 is a view of the apparatus for holding and supplying the hydrocarbon used detached. Fig. 3 is a view in horizontal section of a modified construction of my apparatus. Fig. 4 is a plan view of the retort shown in Fig. 1 and the support thereof. Fig. 5 is a side view of the partition which is placed within the boiler to form the vaporizing-chamber, hereinafter described. Figs. 6 and 7 are an end and plan view of one of the braces employed between the bends of the pipe constituting the retort, as hereinafter described. Fig. 8 is a plan view of a modified form of retort and its support. Figs. 9 and 10 are respectively an end view of the retort shown in Fig. 9 and a side view of one of the sections of pipe composing such retort. Figs. 11, 12, and 13 are cross-sections of different forms of pipes that may be employed in making the retort. Fig. 14 is a view of the reduced end of the pipe from which the retort is formed, and Fig. 15 is a plan view of the burner employed in the furnace beneath the retort or retorts. Fig. 16 is a view showing a modification in the passages through the partition in the boiler which divides off the vaporizing-chamber. Fig. 17 is a view of one of the doors of the furnace detached.

A A' represent the inclosing walls or shell of the furnace, which walls or shell may be made in the form of a rectangle, as in Fig. 1, or circular, which is sometimes desirable, or in any other convenient form. When the furnace is small, or it is wished to have the same portable, the walls or shell A A' may be composed of iron; but in the case of a furnace of large size, or where a number of retorts may be required, the walls of the furnace may be constructed of brick or other suitable material.

B is a boiler, which may be of boiler-plate, copper, or other suitable metal, supported above the furnace. This boiler may rest on the top of the walls or shell A A', and it will correspond in form to that of the walls or shell A A', and will, preferably, be made with a downwardly-projecting flange, b', on the lower side, which flange, when the boiler is placed upon its seat on the walls or shell A A', will pass down outside of the latter, thus aiding in keeping the boiler in place. The boiler has passing through it one or more flues, H, for the escape of the products of combustion from the furnace. The flue or flues may be either round or flattened in cross-section, as may be deemed desirable.

As shown in Fig. 1, the flue H is extended at the upper side of the boiler B to form a flange, upon which may be seated a pipe or chimney, as indicated by dotted lines in Fig. 1. A pipe, I, communicates with the upper side of boiler B, and with the chimney H, and is provided with a valve, W, by means of which communication between the boiler B and chimney H may be opened or closed when desired. By means of this pipe I a portion or all of the steam generated in the boiler may be discharged into the chimney. U is a pressure-gage applied to the boiler, and J a safety-valve. These may be of any known and suitable kind.

E is a feed-water pipe passing through the walls or shell of the furnace, and into the latter a sufficient distance for heating the water before it enters the boiler B. This pipe is provided with a valve, $e$, which controls the flow of water through it, and which also serves to prevent backflow of the water from being occasioned by the pressure of the steam in the boiler. If desired, this pipe may be made with one or more bends to increase the length thereof within the furnace.

Test-cocks S S' S" S"' S"", as many as may be deemed necessary, may be applied to the boiler B, if desired.

By means of a discharge cock or pipe, V, having a valve, $t$, all the contents of the boiler may be drawn off when desired.

The vaporizing-chamber D, as shown in Fig. 1, is formed within the boiler B, being shown in the drawings situated at one end of the boiler. This chamber may be of any desired form. In the drawings I have represented it as having one side formed by the end wall of the boiler B, and its ends by portions of the front and rear walls of the boiler, the bottom and remaining side of the chamber being formed by a partition composed of a bent plate riveted to the end and side walls of the boiler. This plate $d'$ is not in contact with the bottom of the boiler, but its lower portion is situated at a little distance above the same, leaving an underlying water-containing space in the boiler.

It will be seen that the vaporizing-chamber D is located mainly within the water-space of the boiler, and that the heat of the furnace is not applied directly to the chamber, but acts through the medium of the water contained in the boiler. This prevents over-heating, and avoids the danger of explosions. The wall or partition $d'$ is provided at its upper side with apertures $f'$, (shown in Figs. 1 and 5,) through which the steam generated in the boiler B passes directly from the steam-space of the boiler into the vaporizing-chamber D.

I am aware that it has been proposed heretofore to construct apparatus for vaporizing liquids with a vaporizing-chamber located without the boiler-casing, and to inject steam from the boiler into the chamber; but in such cases the bottom of such chamber is wholly removed above the water-space, and instead of the steam passing directly into the chamber from the boiler, it goes through a conducting-pipe leading from the steam-space of the boiler and into the top of the vaporizing-chamber.

$f$ is a flange attached to the upper part of the shell of the boiler, serving to deflect the steam on its entrance into the space $d$ of the vaporizing-chamber downward upon the oil, the surface of which is indicated by the dotted line in Fig. 1. If desired, this flange may be dispensed with, and short sections of pipe F', having their ends bent downward toward the oil in the chamber, may be screwed in the openings $f'$, as shown in Fig. 16.

$d$ is a space in the vaporizing-chamber D, above the surface of the oil, and in which the steam mixes with the vapors of the oil as the same are generated by the heat of the water in the boiler B. The vaporizing-chamber D is provided with a suitable number of test-cocks, $a\ a'$, to determine the quantity of the oil in the chamber, and also with an opening of sufficient size to permit the removal from the chamber of any residuum which will not pass through the pipe P, hereinafter mentioned. This opening is closed by a suitable screw-cap, $d''$.

I may employ two or more vaporizing-chambers within the boiler in some cases, and such chambers will be constructed and disposed in manner similar to that shown and described. From the chamber D leads a pipe, S, provided with a valve, $l$, and communicating with one end of a retort, C', extending across the furnace. If more than one vaporizing-chamber is employed, each will communicate by a separate pipe with pipe S, and also by a separate pipe with measuring-tank X. The retort C', as shown in Figs. 1 and 4, is formed of a pipe, D", bent horizontally a sufficient number of times, the bends returning upon themselves so as to increase the length of the pipe forming the retort, and thus giving an increase of heating-surface proportionate to its increase of length. One end, L, of the retort is connected with pipe S, as before described, and the other end with pipe N, Fig. 1, which pipe leads to retort C, which is constructed in the same manner as retort C'. The pipe forming each of the retorts C C' may be round in cross-section, may have flattened sides, as in Fig. 13, may be elliptical in cross-section, as in Fig. 12, or may be rectangular, as in Fig. 11.

Between the bends of the pipe forming the retort are placed iron braces C". (Shown separately in Figs. 6 and 7.) These braces are cut away at $c'''$ for economy of material, and along their opposite upper edges extend flanges $c''''$, by means of which they may be suspended upon the tops of adjoining bends of the pipe composing the retort.

D' is a metal frame, which is set in the walls of the furnace for the support of each of the retorts. In case of the construction of Fig. 1 this frame is rectangular, as shown in Fig. 4. The frame D has flanges $d'''$, upon which rest the bends of the pipe D".

In some cases it may be desired to make the boiler and furnace circular, or the interior alone of the furnace may be circular. I then construct the retort and its support in the manner shown in Fig. 3. In such figure the bends of the pipe D are so proportioned as to make the retort approximately circular. The circular retort is supported by the ring D''', connected by lugs d'''' to the circular frame E', which in turn is mounted upon arms E'', which may be secured to the walls of the furnace. The braces C'' shown in this figure correspond with those already described, those at opposite sides of the retort being slightly modified in form, however, to adapt them to the interior of the ring D'''. The braces C'' are provided in order to stiffen the retort, and prevent the flattened sides of the pipe of which it is formed from being forced outwardly by the internal pressure of the steam, and one or more of them may be employed between adjacent bends of the pipe. When the pipe D'' is of either of the forms shown in Figs. 11, 12, and 13, the ends thereof are reduced and rounded, as shown in Fig. 14. The said ends are then screw-threaded, as shown. When thus formed, the end B', Fig. 14, may be readily connected to the ends of the pipes S, N, and O by couplings, as in Figs. 3 and 4.

One or more retorts formed as described may be used in one apparatus as may be deemed necessary. Pipe O is connected by suitable couplings with the end of the pipe forming the upper retort, C, or with the end of the pipe forming retort C', if only one retort is used, and conveys the gas, after it has been subjected to heat in passing through the pipes of the retorts C and C', to the gasometer or other desired point. Pipe P communicates with the vaporizing-chamber D at or near the lowest part thereof, and enters the furnace wall or shell below the retorts, and is provided on the end within the furnace with a suitable device for the combustion of hydrocarbon oils, or the distillates thereof, for heating purposes.

$p$ is a suitable valve for opening and closing pipe P, as may be necessary.

In Fig. 15, P' is a chamber forming the central portion of the burner and constructed in a circular form of iron or other suitable metal, and into which pipe P enters.

Q'' are pipes connected with the chamber P' by pipes S' and P''.

P'' are short pipes extending at right angles from the pipe P. The pipes and chamber are all perforated on their upper sides, as shown.

The burner shown in Fig. 15 is rectangular in form to suit the furnace shown in Fig. 1; but it may be partially formed from curved pipes when a circular retort such as is shown in Fig. 3 is employed.

Q is a pipe provided with a valve, $q$, for opening and closing the same, and is connected with pipe P. Through this pipe Q the contents of the vaporizing-chamber D may be made to pass, when the same are not required for combustion in the furnace, by closing valve $p'$ in pipe P and opening valve $q$. Pipe M is connected with the gas-holder, and extends through the walls or shell of the furnace a sufficient distance within the same and underneath the retort C', and is connected at its inner end with the burner for the combustion of gas, when desired, in place of oil. The said pipe M is provided with a valve, $m$. Pipe $l'$ communicates with the interior of the boiler B, as shown at $g'$, Fig. 1, and is connected with pipe P at any suitable point. This pipe $l'$ conveys steam from the boiler into pipe P, causing it to mingle with the oil therein, and aiding in the combustion of the latter within the furnace. It is provided with a valve, $h'$, for opening and closing the same, as may be necessary, as shown in Fig. 1.

Suitable openings, $w'$, are provided in the walls A A' for admitting air within the furnace. These openings may be provided with suitable devices for closing the same.

The main openings in the front of the furnace are closed by doors X', of suitable construction, one of the same being shown detached in Fig. 17. These doors are lined on their inner sides with fire-bricks or soapstone.

The entire surface of the side walls of the furnace, and also of the bottom of the same, is lined with fire-bricks or soapstone slabs to resist the action of the intense heat generated by the combustion of gas or hydrocarbon oil, or its distillates, within the furnace.

R is an oil-supply pipe which communicates with the vaporizing-chamber D through either the top or side wall thereof. This pipe connects with an oil-measuring tank, X, Fig. 2, of known capacity, is provided with a valve, $r$, for opening and closing the same, and conveys the oil from tank X to the vaporizing-chamber D. Tank X is provided with test-cocks. (Shown at $x'$, Fig. 2.)

$x''$ is a pipe through which the oil is conveyed from the reservoir Y into the measuring-tank X, and is provided with a valve for opening and closing the same. (Shown at $y$, Fig. 2.)

A mode of constructing a retort which I may adopt in some cases is shown by Figs. 8, 9, and 10. This retort is formed in sections of pipe rectangular in cross-section, as shown in Fig. 11, having closed ends, and provided in their sides with openings T', as shown in Fig. 10. Into these openings are inserted short pieces of round pipe T'', thus forming communication between the several sections forming the retort. Braces C'' are introduced between the sections of pipe T, and the whole is inclosed within an iron frame-work, T''', of equal depth with the width of the pipes, which are sustained upon a flange projecting from the lower side of the said frame-work.

The operation of my apparatus is as follows: The vaporizing-chamber D is filled with hydrocarbon liquids, preferably the lighter distillates of petroleum, to about three-fifths of its capacity, from the measuring-tank X through the oil feed-pipe R, tank X being supplied through pipe $x''$ from the oil-reservoir Y, which latter may be placed in any convenient location, the flow of the liquid hydrocarbons through pipes R and $x''$ being controlled by valves r and y, respectively. Should more than one vaporizing-chamber be constructed within the same boiler, each would be supplied with oil from the common measuring-tank X, the oil being conducted therefrom into the respective vaporizing-chambers by a separate pipe communicating between the vaporizing-chamber and the tank X and controlled by a suitable valve. The steam generated within the boiler B passes into the vaporizing-chamber D through openings $f'$, and after passing through the latter is deflected downward upon the surface of the liquid hydrocarbons in the chamber. The steam and hydrocarbon vapors after having commingled within the space $d$ of the vaporizing-chamber, pass out through the outlet-pipe S into retort C', where the commingled steam and hydrocarbon vapors are subjected to the heat from the furnace, thence passing through pipe N into the remaining retort, in which they are again subjected to the action of the heat, and finally through pipe O to the gas-holder or other point desired. When desired, the dead oil and residuum within the vaporizing-chamber can be drawn off through pipe P by opening valve $p$, and either fed to the burner or through pipe Q to any point desired.

To aid in the combustion of the dead oil and residuum, a small jet of steam is injected into pipe P at any convenient point in its length through pipe $l'$.

The metal pipe forming the retort C' may be of any desired width in its long diameter to increase proportionately the internal surface thereof, and of any desired width in the short diameter of its cross-section. It is well, however, to have the short diameter not in excess of one inch, and with advantage this diameter may be reduced so that there shall be only one-half of an inch space between the inner surfaces of the sides of the pipe. The flattening of the pipe reduces the thickness of the volume of commingled steam and hydrocarbon vapors to a thin stratum, and as the latter passes along the heated inner surfaces of the pipe every particle of the commingled vapors is brought into direct contact with such heated surfaces, thereby producing a uniform effect thereon, dispensing with perforated diaphragms or other devices within the pipe to break up the volume of vapors and commingle the particles, which diaphragms are absolutely necessary in retorts formed of round pipes, enabling the volume of commingled vapors to pass rapidly through the pipe under a moderate degree of pressure, and increasing the capacity of the apparatus in the production of gas. From the retort or retorts the commingled steam and hydrocarbon vapors pass into the gas-holder in the form of a fixed gas valuable for heating and illuminating purposes. The burner beneath the retort is such that either gas or oil can be used alone, as the fuel to produce the heat required in the manufacture of the gas or combined oil and steam as may be necessary. The oil for supplying the burner will be taken from the vaporizing-chamber D and used in the manner hereinbefore described.

I am aware that a vaporizing-chamber has been placed in the water-space of a boiler, and in this particular my claim is limited to the particular construction and location of the chamber and direct passages, as shown and described.

What I claim, and desire to secure by Letters Patent of the United States, is—

1. The boiler B, having the vaporizing-chamber D formed therein, and mainly in the water-space, and having passages opening from the steam-space of the boiler directly into the said vaporizing-chamber, substantially as described.

2. The boiler B, having within the water-space a vaporizing-chamber, D, and having the bottom of said vaporizing-chamber elevated above the bottom of the boiler to permit of the entrance of a stratum of water beneath the bottom of the said vaporizing-chamber, substantially as described.

3. The boiler B, having a vaporizing chamber, D, provided with means for the introduction of oil, said chamber formed within the same by a partition, $d'$, provided with passages opening from the steam-space of the boiler into the said chamber, substantially as described.

4. The boiler B, having within the same a vaporizing-chamber formed by a partition, $d'$, the said partition being bent, as shown, to form an inclined bottom to the said chamber, elevated above the bottom of the boiler, and being provided with passages whereby steam from the body of the boiler may pass into the vaporizing-chamber, substantially as described.

5. The boiler B, having a vaporizing-chamber, D, formed within the same by a partition, $d'$, and having passages whereby steam is permitted to enter from the steam-space of the boiler into the vaporizing-chamber, and a deflector whereby steam is deflected downward in the said chamber, substantially as described.

6. The boiler B, having within the same the flange $f$, and the partition $d'$, the said partition being bent, as shown, and having the lower portion thereof elevated above the bottom of the boiler to leave a water-space, and having passages $f'$ through the same, substantially as described.

7. The combination, with the boiler B, having within the same a vaporizing-chamber, D, mainly in the water-space, and provided with passages opening directly from the steam-space of the boiler into the vaporizing-chamber, of the furnace, a retort, and a pipe leading from the vaporizing-chamber to the retort, substantially as described.

8. The combination, with the boiler B, having within the same the flange $f$, and the partition $d'$, the said partition being formed with passages $f'$, and having an inclined lower portion elevated above the bottom of the boiler, of the pipe S, a retort, and the furnace, substantially as described.

9. The combination, with the boiler B, the flange f, and the partition d', bent, as shown, and provided with passage-ways f', the lower inclined portion of said partition being elevated above the bottom of the boiler to leave a water-space beneath it, of the pipe S, a retort, and the furnace, substantially as described.

10. The combination, with the boiler B, the bent partition d', formed with the passage-ways f', and having its lower inclined portion elevated above the bottom of the boiler to form a water-space, and the flange f, of the pipe S, a retort, a burner, a pipe, M, for supplying gas, connected with the said burner, a pipe, P, connecting the burner with the vaporizing-chamber, and valves for controlling the flow of gas and oil through the said pipes, substantially as described.

11. The combination, with the boiler, the partition d', formed with passages f', and bent, as shown, the lower inclined portion of said partition being elevated above the bottom of the boiler to form a water-space, the flange f, and means for supplying oil to the vaporizing-chamber formed by the partition, of the pipe S, a retort, the furnace-walls, a burner, a pipe, P, and a steam-pipe, l, substantially as described.

12. The combination of the furnace-walls, the superimposed boiler having a flue passing upward through the same, and having within its shell a vaporizing-chamber, the bottom of which is separated from the bottom of the boiler by a water-containing space, and having steam-passages leading into the said vaporizing-chamber from the body of the boiler, with the pipe S communicating with the upper portion of said vaporizing-chamber, a retort within the furnace, a pipe, P, leading from the lower portion of the vaporizing-chamber, a burner within the furnace, and a feed-water pipe, E, passing through the wall of the furnace and into the latter, substantially as described.

13. The combination, with the boiler B, having within the same the vaporizing-chamber D, of the pipe S, the furnace, and a retort composed of pipe flattened in cross-section and having adjacent parallel lengths, as shown, substantially as described.

14. The retort composed of a pipe flattened in cross-section, and bent upon itself, as shown, and having the braces C'' introduced between the bends at points along such bends to sustain the sides of said pipe, substantially as described.

15. The combination, with the furnace-walls and a frame D', having retort-supporting flanges, of the retort composed of pipe having adjacent parallel lengths, and having braces interposed between adjacent portions of said pipe, substantially as described.

16. The combination, with the furnace-walls and a frame having retort-supporting flanges, of the retort composed of a pipe flattened in cross-section and having adjacent parallel lengths, and having the braces C'' introduced between the lengths, substantially as described.

17. The retort composed of pipe flattened in cross-section, having adjacent parallel lengths, and having reduced externally-threaded ends, substantially as described.

18. The retort composed of a single piece of pipe flattened in cross-section bent upon itself, having braces interposed between adjacent portions of the pipe, as shown, and inclosed within an iron frame-work, rectangular or circular in form, of equal depth with the width of the pipe, and supported upon a flange projecting inwardly from the inner lower edge of said frame-work, substantially as shown and described.

AARON F. RANDALL.

Witnesses:
W. W. JACKSON,
JOS. H. BLACKWOOD.